United States Patent Office 3,538,056
Patented Nov. 3, 1970

3,538,056
POLYAMIDES OF NAPHTHALENE DICAR-
BOXYLIC ACIDS AND BRANCHED CHAIN
DIAMINES
John R. Caldwell, Kingsport, Tenn., assignor to Eastman
Kodak Company, Rochester, N.Y., a corporation of
New Jersey
No Drawing. Continuation-in-part of application Ser. No.
433,493, Feb. 17, 1965. This application Feb. 20, 1968,
Ser. No. 706,797
Int. Cl. C08g 20/00
U.S. Cl. 260—78
12 Claims

ABSTRACT OF THE DISCLOSURE

High melting, linear polyamides having high tensile moduli and useful as films, fibers, molded objects, and extruded objects are prepared from naphthalene dicarboxylic acids (for example, 1.4-; 1,5-; and 2,6-naphthalene dicarboxylic acids) and branched chain diamines (for example, 2-methyl-1,4-diaminobutane, and 2,2-dimethyl-1,5-pentanediamine).

This application is a continuation-in-part of Caldwell U.S. Ser. No. 433,493, filed Feb. 17, 1965, now abandoned.

This invention relates to novel polyamides. More particularly, this invention relates to polyamides prepared from naphthalene dicarboxylic acid compounds and diamines, said polyamides being useful for the production of films, fibers, and molded or extruded objects.

It is known that highly polymeric, linear products are obtained from naphthalene dicarboxylic acids (such as 1,4-naphthalene dicarboxylic acid) and diamines (such as hexamethylene diamine). Although such products possess some valuable properties, they also possess some diadvantageous properties. For example, the simple products are colored and only when such products are formed in admixture with other polyamide-forming compounds are glass-clear products obtained. Such mixed products in general have softening points lower than is desirable.

It is an object of this invention to produce a linear, high melting polyamide from a naphthalene dicarboxylic acid and an alkyl-substituted polymethylene diamine.

It is a further object of this invention to provide polyamides which have a high tensile modulus and good glass-transition temperatures.

It is a still further object of this invention to produce polyamides which are suitable for the manufacture of fibers which are useful as tire cords.

It is an additional object to produce such polyamides which may be converted into fibers, films, and molded and extruded objects.

It is an additional object of this invention to provide such linear polyamides which may be modified by incorporating up to 40 mole percent of another dicarboxylic acid (such as an aliphatic, aromatic, or alicyclic dicarboxylic acid) and/or up to 40 mole percent of an unbranched aliphatic or unbranched alicyclic diamine.

These and other objects are attained by the practice of this invention, at least one embodiment of which comprises providing a high melting, linear polyamide composed essentially of recurring units having the formula:

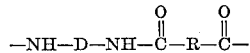

in which at least 60 mole percent of the radical —R— is the divalent radical remaining after the removal of the terminal carboxyl groups from 1,3-; 1,4-; 1,5-; 1,6-; 1,7-; 2,4-; 2,5-; 2,6-; 2,7-; or 2,8-naphthalene dicarboxylic acid and not more than 40 mole percent of the radical —R— is the divalent radical remaining after the removal of the terminal carboxyl groups from a different dicarboxylic acid; and in which at least 60 mole percent of the radical —D— is the divalent radical remaining after the removal of the terminal amino groups from a branched chain diamine having the formula

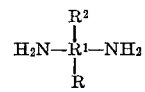

where $R^1$ is a straight chain aliphatic radical containing from four to eight carbon atoms, $R^2$ is hydrogen, methyl, or ethyl, and $R^3$ is methyl or ethyl and not more than 40 mole percent of the radical —A— is the divalent radical remaining after the removal of the terminal amino groups from an unbranched aliphatic diamine or an unbranched alicyclic diamine. The high melting, linear polyamides of this invention are characterized in having a high tensile modulus and are particularly suitable for the manufacture of fibers which may be used as tire cords.

The novel polyamides of this invention are obtained by condensing a naphthalene dicarboxylic acid, having the carboxyl groups in positions such that they cannot form an imide structure, with a branched chain diamine. The naphthalene dicarboxylic acids which may be used are those having the carboxyl groups substituted in the 1,3-; 1,4-; 1,5-; 1,6-; 1,7-; 2,4-; 2,5-; 2,6-; 2,7-; and 2,8-positions. The 2,6-; 1,4-; and 1,5-naphthalene dicarboxylic acids are preferred.

The naphthalene dicarboxylic acid which is condensed with an alkyl-substituted polymethylene-diamine may be in the form of the free acid or its acid chloride, lower alkyl ester, or phenyl ester.

In general, the diamines which are used in preparing the polyamides of this invention are diaminoalkanes in which the alkane group is a hydrocarbon chain having from four to eight carbon atoms substituted by one or two methyl or ethyl groups. If two substituents are present, they may both be on the same or on different carbon atoms. Suitable diamines include 2-methyl-1,4-diaminobutane 2,2-dimethyl-1,4-diaminobutane; 2-ethyldiamino-butane; 2 - methyl - 1,5-diaminopentane; 3-ethyl-1,5-diaminopentane; 2,2 - dimethyl-1,5-diaminopentane; 2,3-dimethyl-1,6-diaminohexane; 3 - ethyl-1,6-diaminohexane; 2-methyl-1,7-diaminoheptane; 2 - ethyl-4-methyl-1,8-diaminooctane; etc.

The polyamides of this invention may be modified by incorporating up to 40 mole percent of another dicarboxylic acid which may be an aliphatic, aromatic, or alicyclic dicarboxylic acid. Examples of such modifying dicarboxylic acids include succinic acid; glutaric acid; adipi acid; azelaic acid; sebacic acid; dimethylmalonic acid; 3,3-diethylsuccinic acid; isophthalic acid; terephthalic acid; phthalic acid; 1,2- and 1,4-cyclohexanedicarboxylic acids; 1,2- and 1,3-cyclopentanedicarboxylic acids; the various naphthalene dicarboxylic acids listed above; etc.

The novel polyamides of this invention may also be modified by incorporating up to 40 mole percent of another diamine which contains an unbranched aliphatic chain or an unbranched alicyclic group. Examples of such other amines include ethylene diamine, tetramethylene diamine, pentamethylene diamine, hexamethylene diamine, etc.

The polyamides of this invention may be prepared by processes well known in the art for making polyamides by the reaction of dicarboxylic acids or derivatives thereof with diamines. For example, in a first step, the dicarboxylic acid and diamine react exothermically in the presence of a small amount of water to form the corresponding diamine salt of the dicarboxylic acid. This salt is then heated, preferably under reduced pressure and in an inert atmosphere, to dehydrate the salt to form the amide bonds.

For polyamides which melt higher than about 280° C., it is preferred to use a solid phase polymerization process. According to this technique, a prepolymer is first prepared by heating the diamine salt of the dicarboxylic acid. The prepolymer is then comminuted to form solid particles and these particles are subsequently heated to a temperature sufficient to accomplish further polymerization but below the temperature at which the particles begin to appreciably cohere.

These polyamides generally have an inherent viscosity of at least 0.4 as measured using 0.25 gram of polymer in 100 ml. of a solvent composed of 60 percent phenol and 40 percent tetrachloroethane.

The novel polyamides of this invention are soluble in many solvents such as formic acid, dimethylformamide, dimethylsulfoxide, trifluoroacetic acid, etc. Films or fibers may be spun or cast from solutions of the polyamides by conventional techniques.

The polyamides may be melt spun according to conventional techniques into fibers and the spun fibers drafted and heat treated to give high melting fibers. These fibers, because of their high modulus, are useful as tire cords.

The polyamides may also be molded by the usual injection, compression, or extrusion processes to form molded objects, tubes, extruded rods, etc., which are generally clear and transparent.

It has also been discovered that the polyamides of this invention quite unexpectedly have higher glass-transition temperatures (Tg) than do polyamides derived from the same diamine and terephthalic acid. The higher Tg is a valuable property, especially when the polyamide is used as a molding plastic. In practical use, the heat-distortion temperature of a molded object under a load of 264 pounds per square inch is essentially the same as the Tg. Therefore, for any given diamine, the compositions of this invention will generally have a higher use temperature (or Tg) than similar compositions derived from terephthalic acid.

The following examples are included for a better understanding of the invention.

EXAMPLE 1

Approximately equal molar amounts of 2,2-dimethyl-1,5-pentanediamine and 2,6-naphthalenedicarboxylic acid are dissolved in a mixture of ethyl alcohol and water at the boiling point. The solution is allowed to cool, and the precipitated salt is filtered and dried. Five grams of the resultant salt is then placed in a glass tube which is then evacuated and sealed. The tube is heated at 290° C. for one hour. A clear, hard prepolymer is obtained which is removed from the tube and ground to a particle size of 20 mesh. The prepolymer is then heated in a vacuum at 260° C. for two hours to build it up. The product has an inherent viscosity of 0.63. The polyamide has a melting point of 287°–296° C. Fibers are spun from this polyamide by the melt process. After being drafted and heat-set, the fibers have the following properties: 6.0 grams per denier tensile strength; 11 percent elongation; 110 initial tensile modulus. The fibers are particularly useful for the manufacture of tire cord. They also are useful in high temperature industrial applications because the hot bar sticking temperature is 260°–270° C. The polyamide is readily molded or extruded to give clear, transparent shaped objects having a high degree of surface hardness.

By way of comparison, the Tg of this polyamide is 174° C., whereas, the polyamide derived from the same diamine and terephthalic acid has a Tg of only 146° C. With a higher Tg, the polyamide of this invention has utility at higher temperatures.

EXAMPLE 2

Using the process of Example 1, a polyamide is made from 2,6-naphthalenedicarboxylic acid and 2,5-dimethylhexamethylenediamine. Fibers made by the melt spinning process from the polyamide product have a hot bar sticking temperature of 280°–290° C. and an initial tensile modulus of 97. The polyamide also is useful as a molding plastic and for the production of film. The molded and extruded products are transparent, even in thick sections.

The Tg of this polyamide is 150°–155° C. On the other hand, a polyamide derived from the same diamine and terephthalic acid has a Tg of approximately 121° C. In practical terms, these values show that the polyamide prepared in accordance with this invention has a use temperature of about 30° C. higher than that of the one derived from terephthalic acid.

EXAMPLE 3

The salt of 2,6-naphthalenedicarboxylic acid and 3-methylheptamethylene diamine is prepared by reacting approximately equal molar amounts of these compounds. The salt is purified by recrystallization from aqueous alcohol and is then heated under nitrogen in an autoclave at 270° C. for one hour. The resulting prepolymer is then melted and stirred in nitrogen at atmospheric pressure for one hour at a temperature of 290–310° C. and finally under vacuum for 30 minutes. The polyamide has an inherent viscosity of 0.87. Fibers made by the melt spinning process have an initial tensile modulus of 90 after being drafted and heat-set.

EXAMPLE 4

Using the process of Example 3, a polyamide is prepared from 2,6 - naphthalenedicarboxylic acid and 4-methyloctamethylenediamine. The resultant polyamide is especially useful as a molding plastic. Shaped objects prepared from the polyamide are transparent and have a softening temperature of from 260° to 270° C.

EXAMPLE 5

A copolyamide is prepared from 0.7 mole of 2,6-naphthalenedicarboxylic acid, 0.3 mole of 1,7-naphthalenedicarboxylic acid, and 1.0 mole of 2-methyl-1,4-diaminobutane by the process described in Example 3. The resultant copolyamide softens at 270°–285° C. and is useful for the production of fibers and molded objects.

EXAMPLE 6

Using the process described in Example 3, a copolyamide is prepared from 0.8 mole of 2,6-naphthalenedicarboxylic acid, 0.2 mole of isophthalic acid, and 1.0 mole of 2-methylpentamethylenediamine. The product softens at 290° to 300° C. Fibers made from the polymer have an initial tensile modulus of from 100 to 105.

EXAMPLE 7

A polyamide is prepared from 2,6-naphthalenedicarboxylic acid and 3-ethylhexamethylenediamine by the process described in Example 3. The product is melt spun into fibers that have a hot bar sticking temperature of 265° to 275° C. and an initial tensile modulus of 106.

EXAMPLE 8

A salt prepared from equal molar amounts of 1,4-naphthalenedicarboxylic acid and 2-methyl-1,6-diaminohexane is heated in an autoclave at 260°–270° C. for two hours. The prepolymer is then stirred at 280°–290° C. in a nitrogen atmosphere for 30 minutes and finally in a 0.1 mm. vacuum for 30 minutes. The polyamide has an inherent viscosity of 0.85. Fibers made from the polyamide have a hot bar sticking temperature of 240°–255° C. and an initial tensile modulus of 94. The polymer also is useful as a molding plastic.

EXAMPLE 9

A polyamide is prepared from 1,5-naphthalenedicarboxylic acid and 2,5-dimethylhexamethylenediamine by the process described in Example 8. Objects molded from the product are clear and have a high degree of surface hardness. The softening point of the product is 230° to 240° C.

Using the process of Example 8, a polyamide is made by heating equivalent amounts of 3,4-dimethylhexamethylenediamine and the diphenyl ester of 2,6-naphthalene dicarboxylic acid. The $Tg$ of this polyamide is 152° C. as compared with 140° C. for the polyamide made from the same diamine and terephthalic acid.

Other similar polyamides may be prepared employing the procedures set forth in the preceding examples and in the more general description set forth hereinabove.

The invention has been described in detail with particular reference to preferred embodiments thereof, but it will be understood that variations and modifications can be effected within the spirit and scope of the invention as described hereinabove and as defined in the appended claims.

I claim:
1. A high melting, linear polyamide composed essentially of recurring units having the formula:

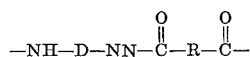

in which at least 60 mole percent of the radical —R— is the divalent radical remaining after the removal of the terminal carboxyl groups from 1,3-, 1,4-, 1,5-, 1,6-, 1,7-, 2,4-, 2,5-, 2,6-, 2,7-, or 2,8-naphthalene dicarboxylic acid and not more than 40 mole percent of the radical —R— is the divalent radical remaining after the removal of the terminal carboxyl groups from a different carbocyclic aromatic dicarboxylic acid, and —D— is the divalent radical remaining after the removal of the terminal amino groups from a branched chain diamine having the formula:

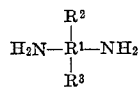

wherein $R^1$ is a straight chain aliphatic radical containing from four to eight carbon atoms, $R^2$ is hydrogen, methyl, or ethyl, and $R^3$ is methyl or ethyl, said polyamide having an inherent viscosity of at least 0.4 as measured using 0.25 gram of polymer in 100 ml. of a solvent composed of 60 percent phenol and 40 percent tetrachloroethane.

2. A high melting, linear polyamide as defined by claim 1 wherein 70 mole percent of said radical —R— is the divalent radical remaining after the removal of the terminal carboxyl groups from 2,6-naphthalene dicarboxylic acid, 30 mole percent of said radical —R— is the divalent radical remaining after the removal of the terminal carboxyl groups from 1,7-naphthalene dicarboxylic acid, and said radical —D— is the divalent radical remaining after the removal of the terminal amino groups from 2-methyl-1,4-diaminobutane.

3. A high melting, linear polyamide as defined by claim 1 wherein 80 mole percent of said radical —R— is the divalent radical remaining after the removal of the terminal carboxyl groups from 2,6-naphthalene dicarboxylic acid, 20 mole percent of said radical —R— is the divalent radical remaining after the removal of the terminal carboxyl groups from isophthalic acid, and said radical —D— is the divalent radical remaining after the removal of the terminal amino groups from 2-methylpentamethylenediamine.

4. A high melting, linear polyamide as defined by claim 1 wherein said radical —R— is the divalent radical remaining after the removal of the terminal carboxyl groups from 2,6-naphthalene dicarboxylic acid and said radical —D— is the divalent radical remaining after the removal of the terminal amino groups from 2,2-dimethyl-1,5-pentanediamine.

5. A high melting, linear polyamide as defined by claim 1 wherein said radical —R— is the divalent radical remaining after the removal of the terminal carboxyl groups from 2,6-naphthalene dicarboxylic acid and said radical —D— is the divalent radical remaining after the removal of the terminal amino groups from 2,5-dimethylhexamethylenediamine.

6. A high melting, linear polyamide as defined by claim 1 wherein said radical —R— is the divalent radical remaining after the removal of the terminal carboxyl groups from 2,6-naphthalene dicarboxylic acid and said radical —D— is the divalent radical remaining after the removal of the terminal amino groups from 3-methylheptamethylenediamine.

7. A high melting, linear polyamide as defined by claim 1 wherein said radical —R— is the divalent radical remaining after the removal of the terminal carboxyl groups from 2,6-naphthalene dicarboxylic acid and said radical —D— is the divalent radical remaining after the removal of the terminal amino groups from 4-methyloctamethylenediamine.

8. A high melting, linear polyamide as defined by claim 1 wherein said radical —R— is the divalent radical remaining after the removal of the terminal carboxyl groups from 2,6-naphthalene dicarboxylic acid and said radical —D— is a divalent radical remaining after the removal of the terminal amino groups from 3-ethylhexamethylenediamine.

9. A high melting, linear polyamide as defined by claim 1 wherein said radical —R— is the divalent radical remaining after the removal of the terminal carboxyl groups from 1,4-naphthalene dicarboxylic acid and said radical —D— is the divalent radical remaining after the removal of the terminal amino groups from 2-methyl-1,6-diaminohexane.

10. A high melting, linear polyamide as defined by claim 1 wherein said radical —R— is the divalent radical remaining after the removal of the terminal carboxyl groups from 1,5-naphthalene dicarboxylic acid and said radical —D— is the divalent radical remaining after the removal of the terminal amino groups from 2,5-dimethylhexamethylenediamine.

11. A fiber of a polyamide as defined by claim 1.
12. A film of a polyamide as defined by claim 1.

References Cited

UNITED STATES PATENTS

| | | | |
|---|---|---|---|
| 2,625,536 | 1/1953 | Kirby | 260—78 |
| 2,752,328 | 6/1965 | Magat | 260—78 |
| 3,154,524 | 10/1964 | Martinek | 260—78 |
| 3,164,630 | 1/1965 | Pietrusza | 260—78 |
| 3,194,794 | 7/1965 | Caldwell | 260—78 |
| 2,296,555 | 9/1942 | Hubert et al. | 260—78 |

HAROLD D. ANDERSON, Primary Examiner

U.S. Cl. X.R.

161—168; 260—30.8, 31.2, 32.6, 33.4

PO-1050
(5/69)

UNITED STATES PATENT OFFICE
CERTIFICATE OF CORRECTION

Patent No. 3,538,056                    Dated November 3, 1970

Inventor(s) John R. Caldwell

It is certified that error appears in the above-identified patent and that said Letters Patent are hereby corrected as shown below:

Column 1, line 19, "1.4-;" should read ---1,4-;---.

Column 2, lines 5-10, the formula should read:

$$H_2N - R^1 - NH_2$$
with $R^2$ above and $R^3$ below $R^1$

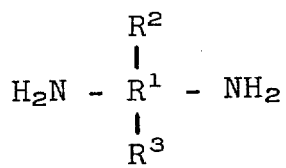

Column 2, line 14, "-A-" should read --- -D- ---. Column 5, lines 26-28, the formula should read:

$$- NH - D - NH - \overset{O}{\underset{\|}{C}} - R - \overset{O}{\underset{\|}{C}} -$$

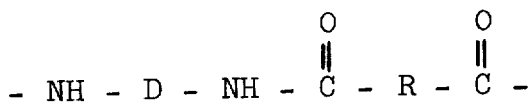

SIGNED AND
SEALED
FEB 9 1971

(SEAL)
Attest:

Edward M. Fletcher, Jr.
Attesting Officer

WILLIAM E. SCHUYLER, JR.
Commissioner of Patents